Nov. 19, 1935.  H. W. WETZEL  2,021,343
DAM FORMING ATTACHMENT FOR LISTER PLOWS
Filed April 11, 1935  3 Sheets-Sheet 2
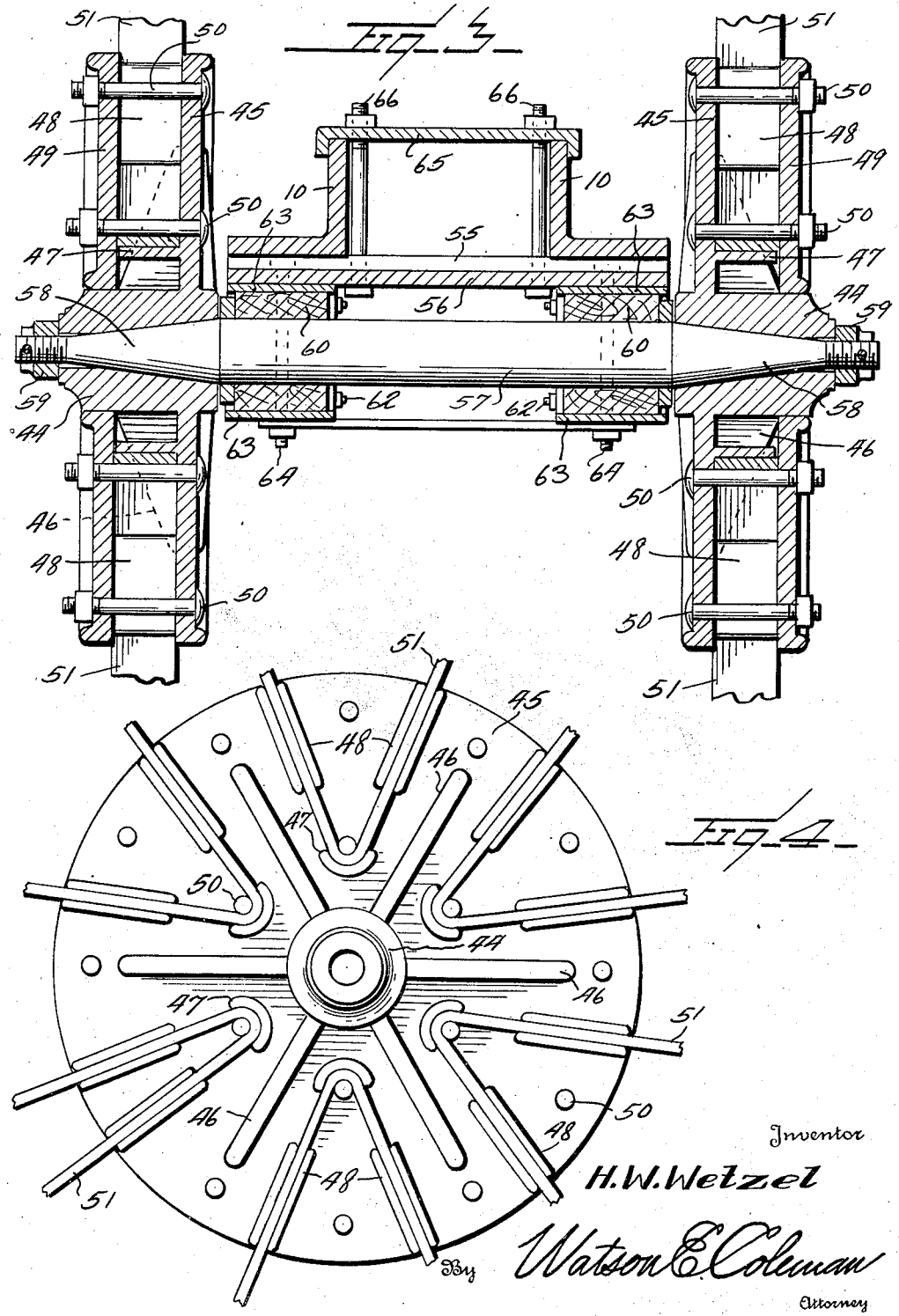
Inventor
H.W. Wetzel
By Watson E. Coleman
Attorney

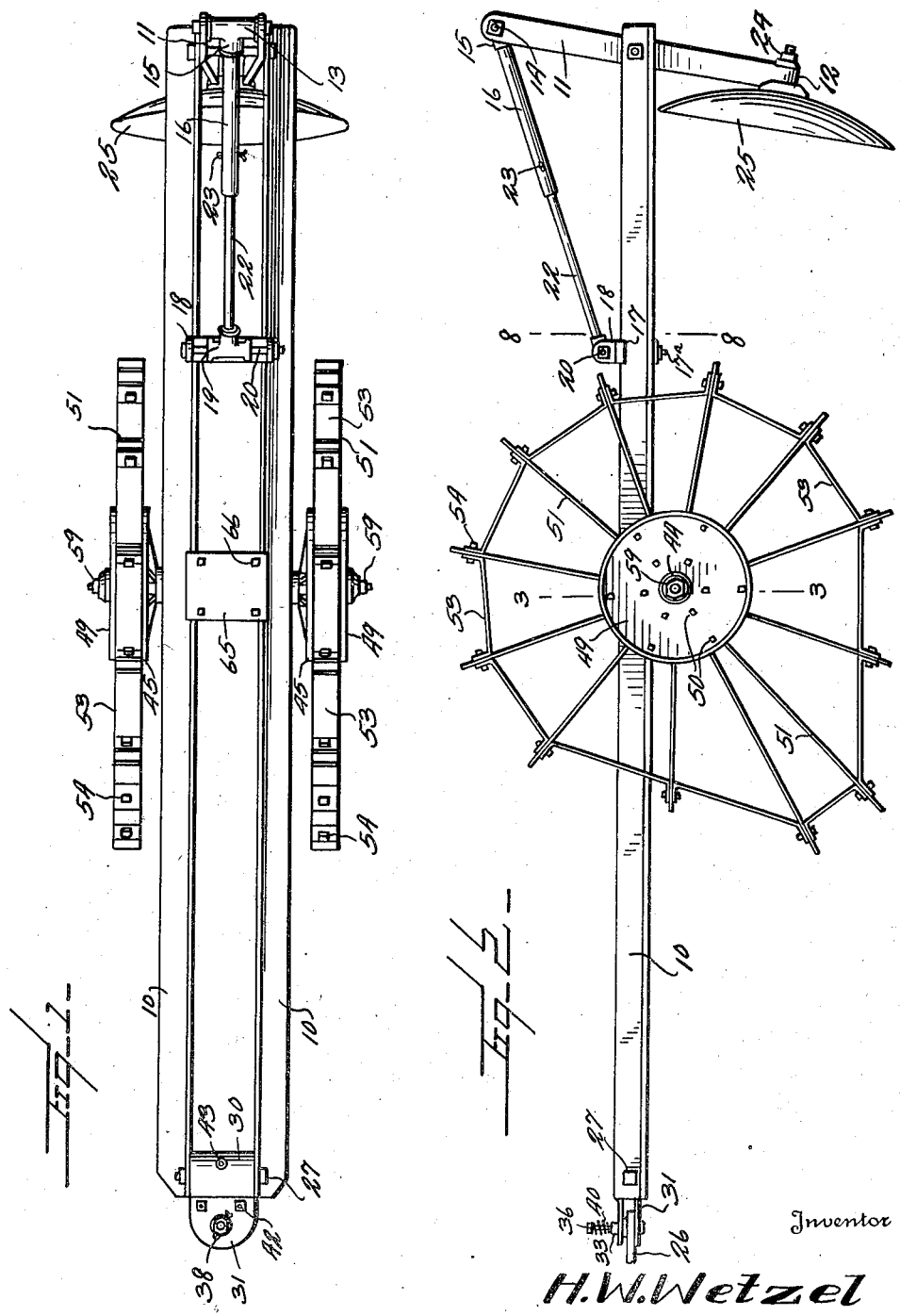

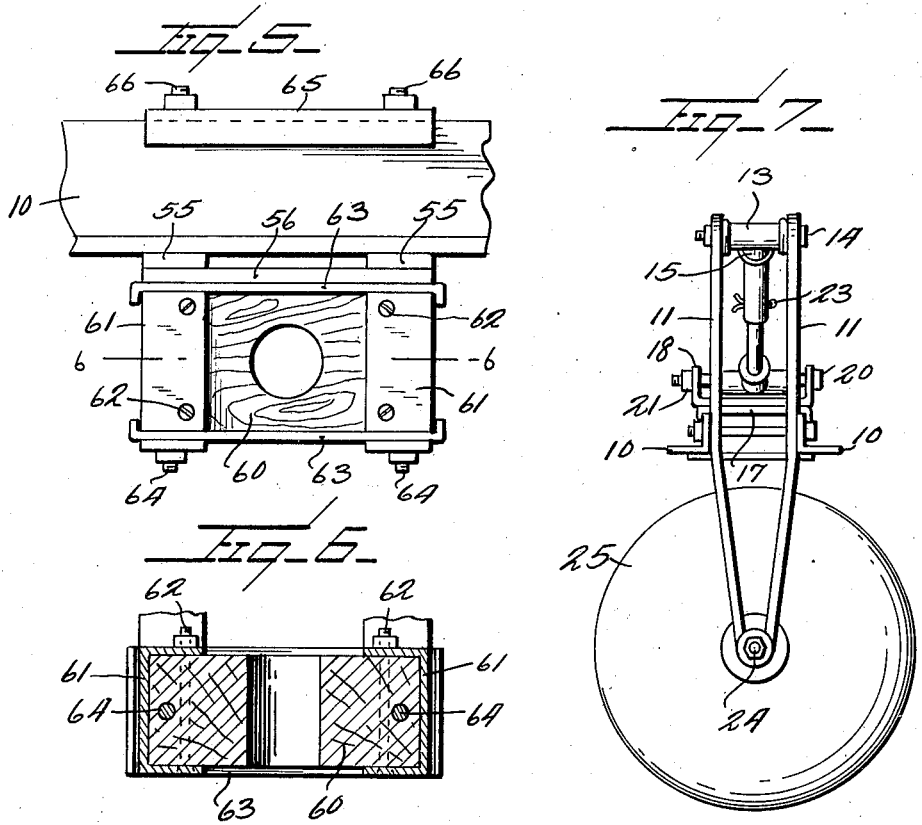
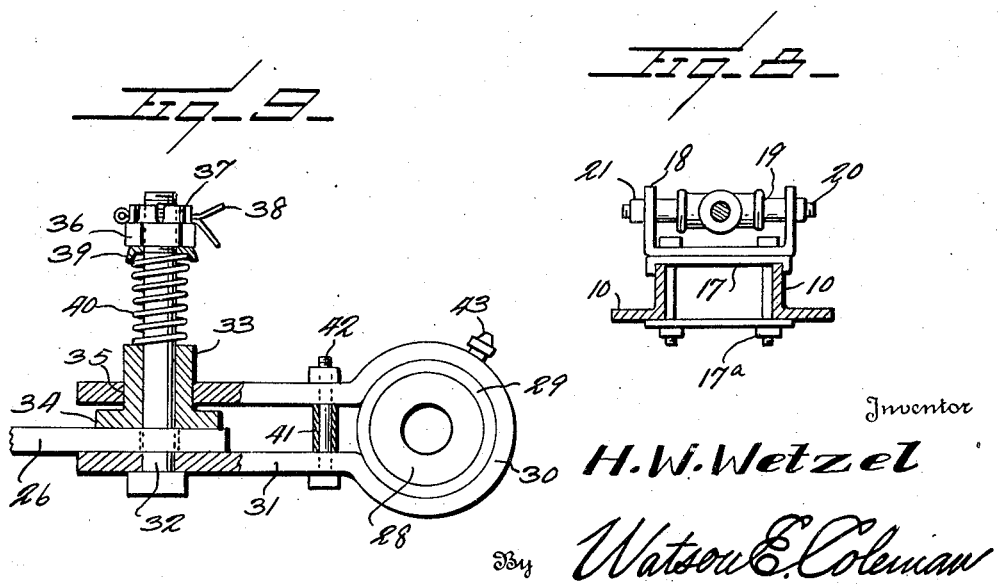

Patented Nov. 19, 1935

2,021,343

UNITED STATES PATENT OFFICE 2,021,343

DAM FORMING ATTACHMENT FOR LISTER PLOWS

Harry W. Wetzel, Bellefont, Kans.

Application April 11, 1935, Serial No. 15,859

7 Claims. (Cl. 97—55)

The object of the present invention is to provide an attachment adapted to be applied to and operate behind a lister plow, the attachment being so constructed that it will automatically form dams in the furrow made by the plow, these dams being formed at spaced intervals.

The object of damming up the lister furrows is to prevent soil erosion by wind or water. This is a problem which confronts the farmers of the greater part of the western farming territory. By forming a series of evenly spaced dams along the furrows formed by a lister plow, a field so worked will not have its soil blown off and rain will not drain off unless the rain comes in cloudburst proportions. With this object in view, my invention consists in the provision of a frame having means whereby it may be attached to a lister plow or any other draft means which frame carries at its rear end a scraper and is provided with one or more eccentric wheels which, as the attachment is drawn over the ground, will intermittently lift the scraper up so that it will pass over the dam or earth drawn up by the scraper and then allow the scraper to drop down again immediately in front of the dam and scrape along until another dam has been formed.

A further object is to provide certain details of construction and arrangement of parts which permit of the attachment being readily repaired whenever necessary, and which tend to cheapen the construction of the attachment.

My invention is illustrated in the accompanying drawings wherein:

Figure 1 is a plan view of the attachment;

Figure 2 is a side elevation thereof;

Figure 3 is a detailed section on the line 3—3 of Figure 2;

Figure 4 is a side elevation of the inside disk of one of the wheels;

Figure 5 is a fragmentary elevation of the frame and the axle supporting bearings thereon, the wheel and axle being removed;

Figure 6 is a section on the line 6—6 of Figure 5;

Figure 7 is a fragmentary rear elevation showing the scraper disk and its supporting means;

Figure 8 is a section on the line 8—8 of Figure 2;

Figure 9 is a fragmentary elevation partly in section of the clevis whereby the frame of the attachment may be connected to the plow.

Referring now to Figures 1 and 2, it will be seen that my attachment comprises a frame consisting of two parallel longitudinally extending angle irons, designated 10. These angle irons at their forward ends are connected to a draft attachment whereby the frame may be connected to a lister or any other plow or to a tractor or other draft applying means. The rear end of the frame has disposed between the angle irons 10, a lever designated generally 11, this lever, as shown in Figure 7, being formed of a single bar of iron bent at its middle to form a bight 12 and at its upper end, the arms of the V-shaped lever are spaced apart by means of the sleeve 13 into which a bolt 14 passes. This sleeve 13, as shown in Figure 7, is in the form of a T, to provide a nipple 15 from which extends a pipe section 16. Mounted upon the angle irons 10, as shown in Figure 8, is a transverse supporting bar 17. Mounted upon this is the U-shaped support 18. Disposed between the arms of this U-shaped support is a spacing sleeve 19 through which a bolt 20 passes having nuts 21 at its ends. This sleeve 19 is also in the form of a T and extending from this sleeve is a rod 22 which telescopes into the tubular section 16 and is engaged therewith by a frangible brake-pin 23. These sections 16 and 22 with the pin 23 constitute a brace holding the lever 11 in a downwardly and forwardly inclined position. Mounted in the bight 12 of this lever is a bolt 24 which is a stub bolt extending from the rear face of a concave scraper disk 25.

The forward end of the frame 10 is held in engagement with a draft bar projecting from the lister plow, a tractor, or any other draft element, by means of a clevis shown in detail in Figure 9. The draft bar is designated 26. Passing through the forward ends of the angle irons 10 is a bolt 27. Surrounding this bolt is a tubular sleeve 28 and surrounding the sleeve is a second sleeve 29. Embracing this second sleeve 29 is the bight 30 of a clevis 31. The lower arms of this clevis are apertured for the passage of a vertical bolt 32. Mounted upon this bolt is a bushing or sleeve 33 having a base portion 34 resting upon the draft bar 26 and having a shank portion which extends up through an aperture 35 in the upper arm of the clevis. The upper end of the bolt 32 carries upon it the two nuts 36 and 37, the upper nut being castellated and locked in place by a cotter pin 38. Between a washer 39 and the upper end of the member 33, a compression spring 40 is disposed. This construction permits of the frame composed of the angle irons 10 rising and falling with reference to the draft bar 26 and also swinging laterally with reference to the draft bar and at the same time permits the draft bar 26 to oscillate within a short range without affecting the frame 10. A spacing sleeve 41 is disposed between the rear ends of the arms of the clevis and is held in place by a bolt 42. Oiling means, designated 43, is mounted upon the portion 36 so as to lubricate the pivotal connection between the frame and the draft bar.

Mounted upon the frame 10 midway of its ends is a pair of eccentric wheels so designed as to secure tractive engagement with the ground in all positions of the wheels. These wheels rotate as the attachment is drawn over the ground and as they rotate, they act to lift the rear end of the frame upward at spaced intervals, hold it up for a moment or so, and then lower the frame and scraper. A detailed construction of these wheels is illustrated in Figures 3 and 4. Each wheel comprises a hub 44 and extending from the hub is an inner disk 45 which is shown as integral with the hub. This disk 45 has projecting from it the radial ribs 46 extending radially from the hub, and between these ribs the inner face of the disk 45 is provided with a plurality of curved seats 47, and associated with each seat 47 are two pairs of radial guide ribs 48. Confronting the disk 45 is an annular disk 49, which is held upon the hub and in confronting relation to the disk 45 by means of the bolts 50. Disposed between these disks are the bight ends of approximately V-shaped strips 51 constituting spokes. The two arms of each strip 51 form a pair of spokes and these extend radially outward from the disk, as shown clearly in Figure 2. Disposed between these arms or spokes is a series of plates 53 angled at their ends and fitting between the spokes inward of the ends thereof and bolted to the spokes by the bolts 54.

It will be seen from Figure 2 that eight of these spokes 51 have the same radius, that two of these spokes are relatively long, and that intermediate spokes are disposed between these relatively long spokes and the first named spokes. As a consequence, the wheel is eccentric, approximately two-thirds of the wheel being concentric to the axis of the wheel, the remaining third being steeply eccentric. It will be seen likewise that the spokes project beyond the plate 53 so as to form lugs adapted to engage in the ground. With this construction, as the frame is drawn forward, the wheels, by traction with the ground, will rotate, but as they rotate, the frame 10 will be supported in horizontal position until the highly eccentric portion of the wheel engages with the ground, when the frame will be lifted and held lifted for a predetermined period and then dropped, and will remain dropped or in its scraping position for a predetermined period and then will be again lifted, etc. These wheels, as will be later described, are adjustable along the frame so as to secure a greater or less lifting action upon the scraper 25.

The construction whereby the wheels are mounted and the means for adjusting these wheels is shown most clearly in Figures 3, 5 and 6.

Disposed beneath the horizontal flanges of the angle irons 10 are cross bars 55, as shown in Figure 5, and disposed below these cross bars is a plate 56. The axle 57 has a cylindrical middle portion and tapered ends 58 which fit within the hubs 44, the wheels being held in place by means of nuts 59. The axle passes through wooden bearing blocks 60. Each bearing block 60 at its ends is embraced by U-shaped metallic members 61, as shown in Figure 6, these being held in place by the bolt 62. Disposed above and below each block 60 are the plates 63 having angularly turned ends to embrace the blocks. Extending downward through the cross bars 55, through the plate 56, through the plates 63, and through each block 60, are the bolts 64. These hold the cross bars 55, the plate 56, the plate 63 and the corresponding bearing blocks together as a unit. Extending over the top of the angle irons 10 is a clamp plate 65 and bolts 66 pass downward through this clamp plate and through the cross bars 55 and the plate 56, thus clamping the axle supporting element to the frame. By loosening the bolt 66, the axle supporting element may be shifted longitudinally of the frame to thus dispose the wheels nearer to or further from the scraper and thus secure variations in the amplitude of movement of the scraper.

The construction which I have heretofore described provides an attachment frame which may be readily drawn behind a lister plow or any other element constituting a draft element, and as this frame is drawn along, the scraper will be alternately lowered for a relatively long period of time and then quickly raised and then quickly dropped. The scraping disk, as it is drawn along, scrapes up earth ahead of it and until a dam or obstruction has been formed transversely of the furrow, then the disk is raised to pass over the dam or obstruction and is again lowered. Thus where this device is used in connection with a lister plow or any other plow, a series of dams is formed in the furrow which will act to hold water and prevent the water from running off and which, because of the fact that they will hold water, will act to conserve previous rainfalls and hold water between the dams thus formed, thus rendering the adjacent soil damp and tending to prevent erosion by winds in case of drought, and these dams also act to prevent the water from running off too rapidly from the land.

It will be seen that by using the break-pin 23, provision is made for preventing breakage of the scraper 25, the lever 11 or allied parts, in case the scraper strikes a stone or boulder or any other obstruction.

It will be likewise noted that the plates 17 and 18, being held in place by the bolt 17a, may be readily shifted along the frame 10, so as to dispose the scraper disk at any desired angle found most effective for the work intended. Thus, the scraper disk may be adjusted to merely scrape, or it may be adjusted at such an angle that it will not only scrape but dig the soil as it passes along.

While I have illustrated certain details of construction and arrangement of parts, I do not wish to be limited to these, as it is obvious that many changes might be made without departing from the spirit of the invention as defined in the appended claims, though I have found, however, that the details which I have illustrated are particularly practical and permit the structure to be cheaply made and readily repaired.

Thus, I prefer to use the wooden bearings 60 because they may be initially oil-soaked, and thereafter require no oiling and will out-wear any other type of open bearing. The axle 57 rotates within these bearing blocks very slowly and thus little friction is caused. Furthermore, these bearings may be cheaply replaced. The axle 57 is tapered at 58 so that the eccentric portions of the wheels can be easily alined. Should the wheels become loose on the axle, they can be easily drawn up tight by tightening the nuts 59.

What is claimed is:—

1. A furrow dam forming attachment for lister plows including a frame having draft means whereby it may be connected to a lister, the means permitting the rear end of the frame to move vertically, a scraper attached to and depending from the rear end of the frame, and an eccentric traction wheel supporting the frame and acting as it moves over the ground to intermittently lift and drop the rear end of the frame and scraper.

2. A furrow dam attachment including a frame having draft means whereby it may be connected to a draft element, the means permitting the rear end of the frame to move vertically, a scraper attached to and depending from the rear of the frame, and an eccentric traction wheel supporting the frame, the traction wheel being adjustable along the frame toward or from the scraper.

3. A furrow dam attachment including a frame having draft means whereby it may be connected to a draft element, the means permitting the rear end of the frame to move vertically, a scraper attached to and depending from the rear of the frame, and an eccentric traction wheel supporting the frame, the traction wheel being adjustable along the frame toward or from the scraper, the scraper being adjustable into different angles with relation to the frame.

4. A furrow dam forming attachment including a frame having draft means whereby it may be connected to a draft element, the means permitting the rear end of the frame to move vertically, a scraper attached to and depending from the rear end of the frame, and a pair of eccentric traction wheels supporting the frame, the traction wheels having peripheral radially extending lug-like elements adapted to engage in the ground.

5. A furrow dam forming attachment including a frame having draft means whereby it may be connected to a draft element, the means permitting the rear end of the frame to move vertically, a scraper attached to and depending from the rear end of the frame, a pair of eccentric traction wheels supporting the frame, each traction wheel including a hub, a disk integral with the hub, an opposed disk, bolts detachably connecting the disks to each other, spokes detachably held between said disks and extending radially outward therefrom, the greater portion of the spokes having the same radius but certain of the spokes having a longer radius than the other spokes, and plates connecting the spokes and disposed at adjacent ends thereof, the plates describing an eccentric rim, the spokes projecting beyond the rim to form ground engaging lugs.

6. A furrow dam forming attachment including a frame having draft means whereby it may be connected to a draft element, the means permitting the rear end of the frame to move vertically, a scraper attached to and depending from the rear end of the frame, a pair of eccentric traction wheels supporting the frame, each traction wheel including a hub, a disk integral with the hub, an opposed disk, bolts detachably connecting the disks to each other, spokes detachably held between said disks and extending radially outward therefrom, the greater portion of the spokes having the same radius but certain of the spokes having a longer radius than the other spokes, and plates connecting the spokes and disposed at adjacent ends thereof, the plates describing an eccentric rim, the spokes projecting beyond the rim to form ground engaging lugs, one of said plates having seats for engaging said spokes.

7. A furrow dam forming attachment including a frame having draft means whereby it may be connected to a draft element, the means permitting the rear end of the frame to move vertically, a scraper attached to and depending from the rear end of the frame, a pair of eccentric traction wheels supporting the frame, each traction wheel including a hub, a disk integral with the hub, an opposed disk, bolts detachably connecting the disks to each other, spokes detachably held between said disks and extending radially outward therefrom, the greater portion of the spokes having the same radius but certain of the spokes having a longer radius than the other spokes, and plates connecting the spokes and disposed at adjacent ends thereof, the plates describing an eccentric rim, the spokes projecting beyond the rim to form ground engaging lugs, each pair of spokes being formed by a single V-shaped element, one of said disks having seats for the reception of the bight portions of the U-shaped spokes and having pairs of spaced ribs within which these spokes are disposed.

HARRY W. WETZEL.